(12) United States Patent
Albertson (10) Patent No.: US 9,661,804 B1
(45) Date of Patent: May 30, 2017

(54) VEGETATION TRIMMER

(71) Applicant: Robert V. Albertson, Alma, WI (US)

(72) Inventor: Robert V. Albertson, Alma, WI (US)

(*) Notice: Subject to any disclaimer, the term of this patent is extended or adjusted under 35 U.S.C. 154(b) by 62 days.

(21) Appl. No.: 14/535,289

(22) Filed: Nov. 6, 2014

(51) Int. Cl.
*A01D 34/416* (2006.01)
*A01D 34/90* (2006.01)
*A01D 34/67* (2006.01)

(52) U.S. Cl.
CPC ....... *A01D 34/4166* (2013.01); *A01D 34/416* (2013.01); *A01D 34/4165* (2013.01); *A01D 34/67* (2013.01); *A01D 34/90* (2013.01)

(58) Field of Classification Search
CPC ........... A01D 34/412; A01D 34/416; A01D 34/4161; A01D 34/4165; A01D 34/4166; A01D 34/4168; A01D 34/67; A01D 34/736; A01D 2101/00; A01D 34/733; A01D 34/90
See application file for complete search history.

(56) References Cited

U.S. PATENT DOCUMENTS

| | | | | |
|---|---|---|---|---|
| 3,589,112 A * | 6/1971 | Frohmader | ............ | A01D 34/82 172/42 |
| 4,058,959 A * | 11/1977 | Moss | .................... | A01D 34/736 56/295 |
| 4,374,465 A * | 2/1983 | Comer | .................. | A01D 34/416 56/12.7 |
| 4,513,563 A * | 4/1985 | Roser | ................. | A01D 34/4168 464/32 |
| 4,819,416 A * | 4/1989 | Jones | ..................... | A01D 34/73 30/276 |
| 4,936,884 A * | 6/1990 | Campbell | .......... | A01D 34/4168 30/276 |
| 5,313,770 A * | 5/1994 | Smothers | ............. | A01D 34/416 30/276 |
| D349,634 S | 8/1994 | Skinner et al. | | |
| 5,430,943 A * | 7/1995 | Lee | .................... | A01D 34/4168 30/276 |
| 5,479,763 A * | 1/1996 | Coble | .................. | A01D 34/416 56/12.7 |
| D389,382 S | 1/1998 | Houle | | |
| 5,713,191 A * | 2/1998 | Welton | ................. | A01D 34/416 30/276 |
| D417,597 S | 12/1999 | Sutliff et al. | | |
| 6,158,129 A * | 12/2000 | Klein | ................. | A01D 34/4166 30/276 |
| D439,118 S | 3/2001 | Tomita | | |
| D439,813 S | 4/2001 | Tomita | | |
| 6,301,863 B1 * | 10/2001 | Liebrecht | ............... | A01D 34/84 56/10.6 |
| 6,519,857 B1 | 2/2003 | Proulx et al. | | |
| 6,601,373 B1 | 8/2003 | Legrand | | |
| D496,840 S | 10/2004 | Iacona | | |

(Continued)

FOREIGN PATENT DOCUMENTS

| | | | | |
|---|---|---|---|---|
| CH | 704594 A2 * | 9/2012 | ......... | A01D 34/4166 |
| DE | 2556553 A1 * | 6/1977 | .......... | A01D 34/416 |

(Continued)

*Primary Examiner* — Jennifer Swinney
(74) *Attorney, Agent, or Firm* — Richard John Bartz (57) ABSTRACT

A vegetation trimmer has a motor driven cutting head with cutting tools having blades and flexible filaments attached to the blades. The blades have first and second holes accommodating the flexible filaments.

16 Claims, 9 Drawing Sheets

(56) References Cited

U.S. PATENT DOCUMENTS

| | | | |
|---|---|---|---|
| 6,986,239 B1 * | 1/2006 | Compton | A01D 34/736 |
| | | | 56/17.5 |
| D532,263 S | 11/2006 | Iacona | |
| 7,257,898 B2 | 8/2007 | Iacona | |
| D574,679 S | 8/2008 | Denby | |
| D610,886 S | 3/2010 | Bauer | |
| D675,073 S | 1/2013 | Milburn | |
| D679,156 S | 4/2013 | Lyles | |
| 8,973,274 B2 * | 3/2015 | Proulx | A01D 34/4166 |
| | | | 30/122 |
| 2015/0107118 A1 * | 4/2015 | Banjo | A01D 34/4168 |
| | | | 30/276 |

FOREIGN PATENT DOCUMENTS

| | | | | |
|---|---|---|---|---|
| DE | FR 2499448 A1 * | 8/1982 | | A01D 34/736 |
| IT | EP 1110441 A1 * | 6/2001 | | A01D 34/416 |
| SI | EP 1614337 A1 * | 1/2006 | | A01D 34/4166 |
| SI | EP 2668836 A1 * | 12/2013 | | A01D 34/4166 |

\* cited by examiner

VEGETATION TRIMMER

CROSS REFERENCE TO RELATED APPLICATION

This application claims the priority benefit of U.S. Provisional Application Ser. No. 61/963,100 filed Nov. 25, 2013.

FIELD OF THE INVENTION

The invention relates to vegetation trimmers, known as string trimmers, having power driven heads with cutting tools. The cutting tools have plastic filaments or cords that move in a circumferential path to cut vegetation.

BACKGROUND OF THE INVENTION

Vegetation trimmer and brushcutters are used for maintaining lawns, gardens, and landscaping. The vegetation trimmers have elongated handles attached to rotating heads having cutting tools, such as cords or knives, operable to cut vegetation. Motors, such as electric motors or lightweight internal combustion engines mounted on the handles operate to rotate the heads ad cutting tools. Debris shields mounted on the handles over the cutting path of the cutting tools help to protect the vegetation trimmer workperson from flying debris. Vegetation trimmers for cutting grass, weeds and light plants have cutting heads with flexible plastic filaments or cords. The cords are not effective in cutting heavy vegetation such as brush and hay. Vegetation trimmers having cutting heads with radial knives and blades are used for heavier vegetation. Cutting heads with combined cords and knives used to cut grass, weeds, light plants and heavy vegetation are needed for vegetation trimmers to cut all types of vegetation.

SUMMARY OF THE INVENTION

The vegetation trimmer of the invention has a cutting head with cutting tools rotatably driven with a motor to cut grass, weeds and heavy vegetation, such as brush. The cutting tools have blades or knives and elongated flexible filaments connected to the blades. The blades are rigid plastic or metal members having side knife edges and heads attached to the cutting heads for rotation in a circular plane below a shroud of the vegetation trimmer. The flexible filaments are plastic cords or strings. The combined blades and flexible filaments rotate with the cutting head to cut vegetation and direct cut vegetation debris away from the vegetation trimmer. Each blade has a first pair of holes and at least one second hole spaced from the first pair of holes. In one embodiment of the blade, a second pair of holes are spaced outwardly from the first pair of holes. The flexible filaments are a one-piece plastic cord having portions extended through the first pair of holes, segments crossed over the blade and portions extended through the at least one second hole with the remaining sections of the cord extended generally radially away from the out end of the blade. The crossed segments of the cord anchor the cord to the blade and prevent the cord from separating from the blade. The single cord can be removed from the blade and replaced with a new cord.

DESCRIPTION OF THE VEGETATION TRIMMER

Figure 1:
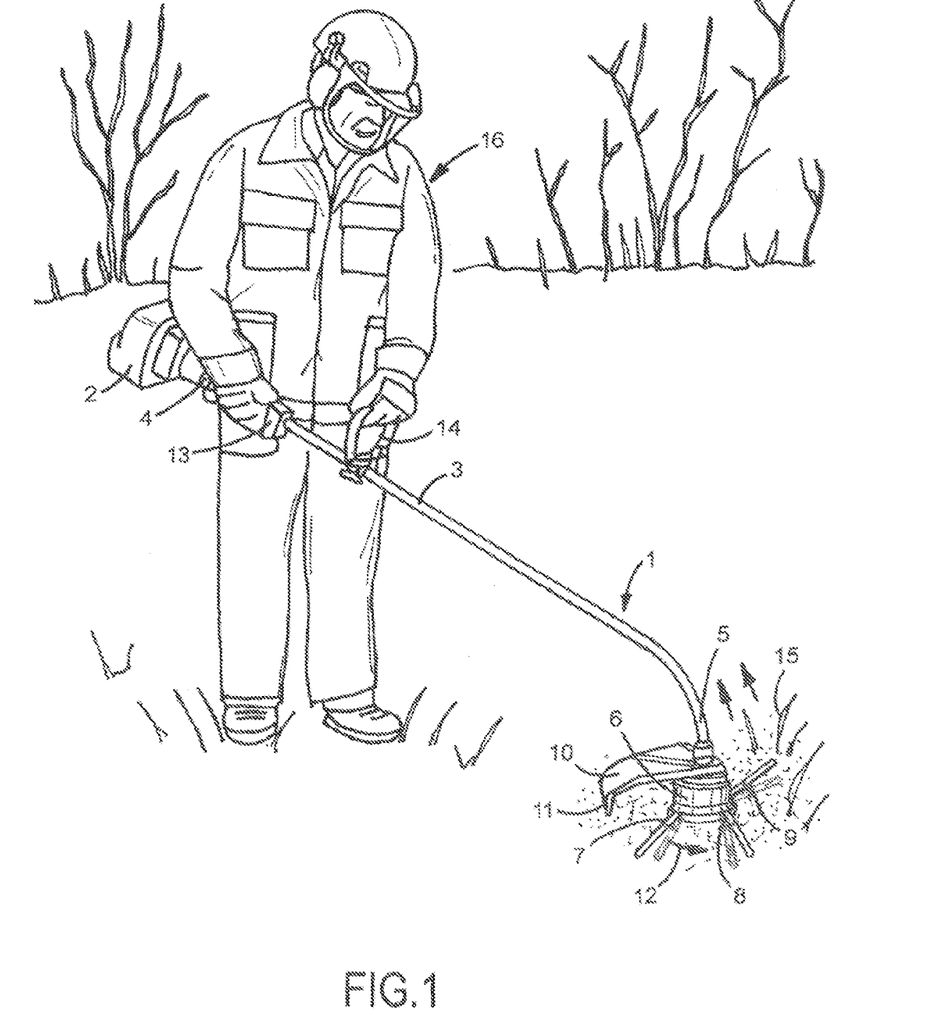
FIG. 1 is a perspective view of a workperson operating a vegetation trimmer equipped with combined cutting blades and flexible filaments.

A vegetation trimmer 1, shown in FIG. 1, is held by a workperson 16 and moved in lateral directions relative to vegetation 15, such as grass, weeds, plants, plants, and brush, to cut the vegetation into vegetation debris. Vegetation trimmer 1 has a motor 2 connected to a wand or elongated tubular member 3. Wand 3 has a lower end 5 supporting a rotatable cutting head 6. Motor 2 is shown as a lightweight internal combustion engine mounted on the upper end 4 of wand 3. The motor can be an electric motor. A power transmission apparatus (not shown) drivably connects the motor 2 to cutting head 6 whereby an operation of motor 2 the cutting head 6 is rotated as shown by arrow 12. A guide handle 13 and bail handle 14 attached to wand 3 are used by workperson 16 to retain cutting head 6 adjacent the ground supporting the vegetation 15. Cutting head 6 is partially covered with a circular sector-shaped shroud 10 having a downwardly extended wall 11. Shroud 10 inhibits cut debris from flying toward workperson 16.

Figures 2, 3:
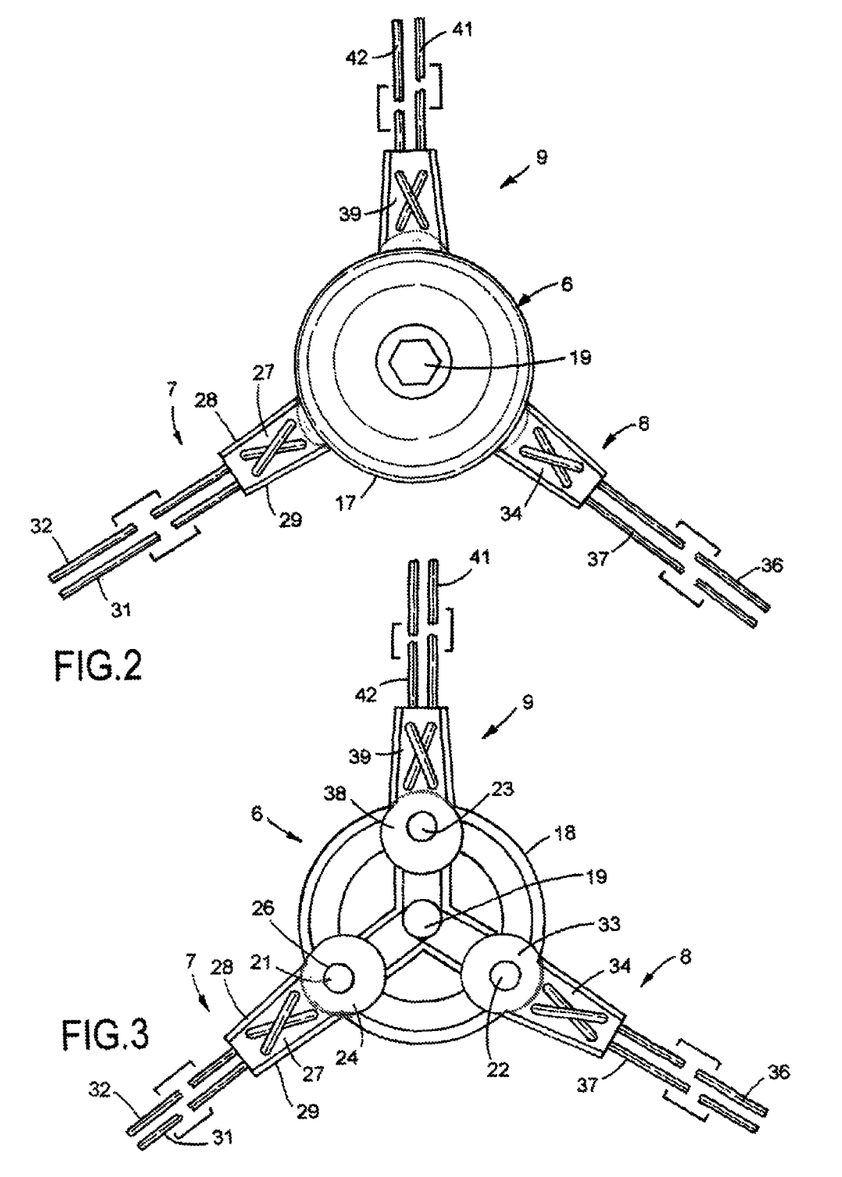
FIG. 2 is an enlarged bottom plan view of the rotatable head with combined cutting blades and flexible filaments of FIG. 1.
FIG. 3 is an enlarged plan view of the rotatable head with the bottom member removed with the combined cutting blades and flexible filaments of FIG. 1.
Figure 4:
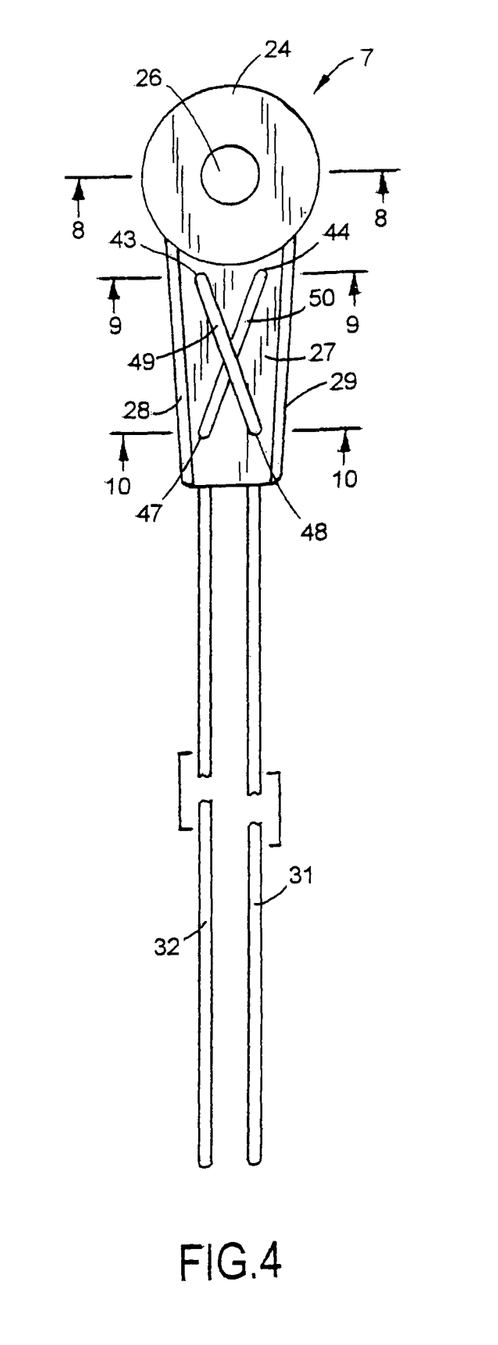
FIG. 4 is a top plan view of a combined cutting blade and foreshortened flexible filaments.
Figure 5:
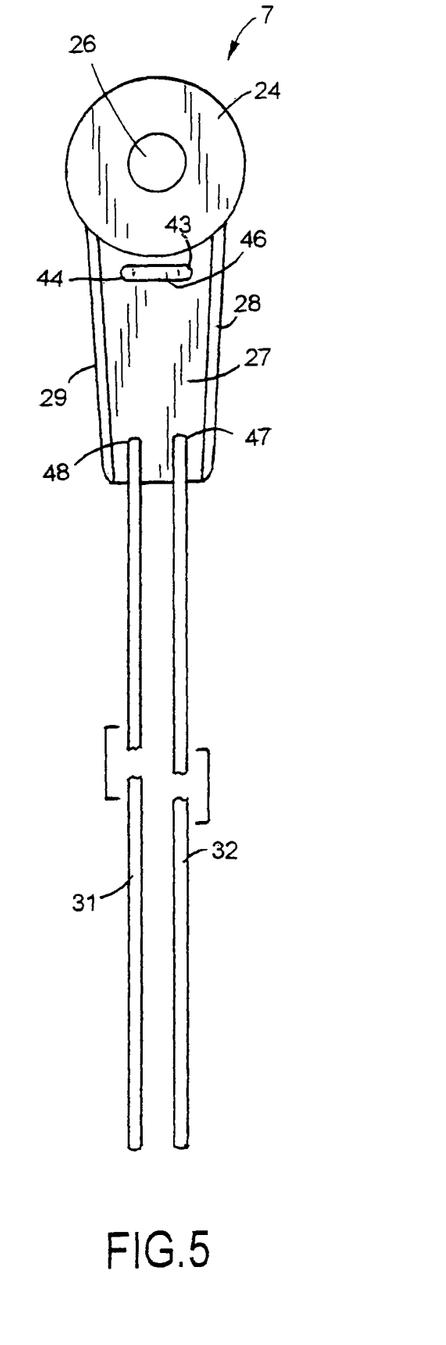
FIG. 5 is a bottom plan view of the combined cutting blade and foreshortened flexible filaments of FIG. 4.
Figure 6:
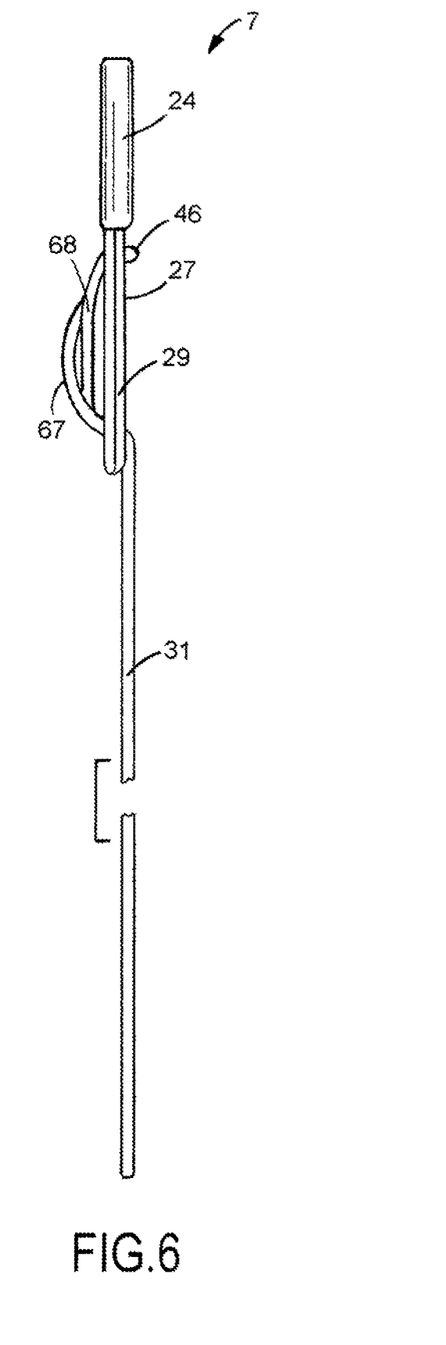
FIG. 6 is a side elevational view of the right side of FIG. 4.
Figure 7:
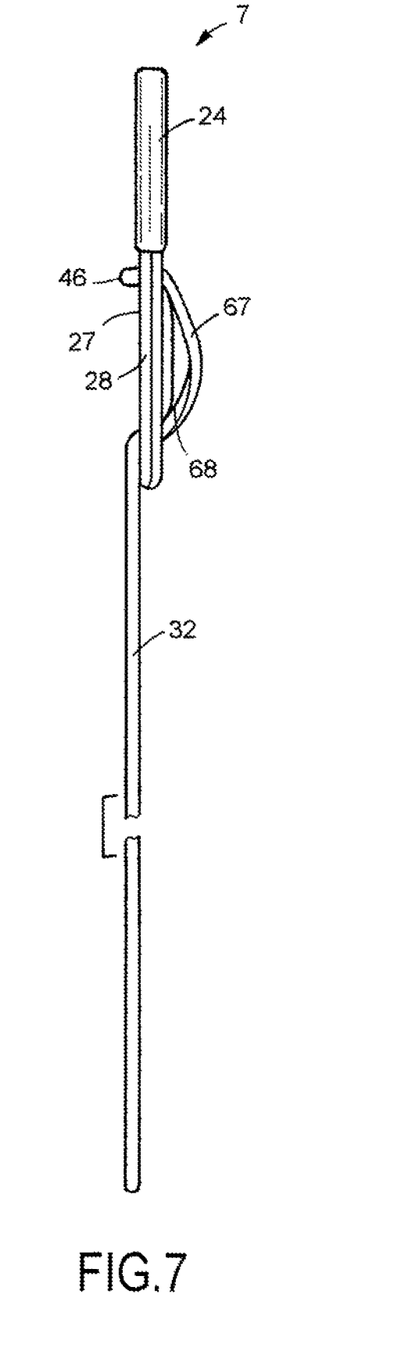
FIG. 7 is a side elevational view of the left side of FIG. 4.
Figure 8:
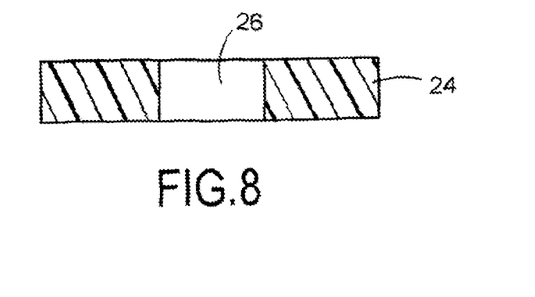
FIG. 8 is an enlarged sectional view taken along line 8-8 of FIG. 4.

Cutting head 6 has a plurality of cutting tools 7, 8 and 9 that extend in outward radial directions. As shown in FIGS. 1, 2 and 3, cutting head 6 has three circumferentially spaced cutting tools 7, 8 and 9. The adjacent cutting tools 7, 8 and 9 are circumferentially spaced about 135 degrees from each other. Cutting head 6 has a bottom member 17 and a top member 18 clamped together with a fastener 19, such as a bolt connected to the drive shaft of the power transmission apparatus. As shown in FIG. 3, top member 18 has three pins 21, 22 and 23. Cutting tools 7, 8 and 9 rotatably mounted on pins 21, 22 and 23 swing to radial positions during rotation of cutting head 6. The number of cutting tools associated with a cutting head can vary. The size of the cutting head can also vary.

Figure 9:
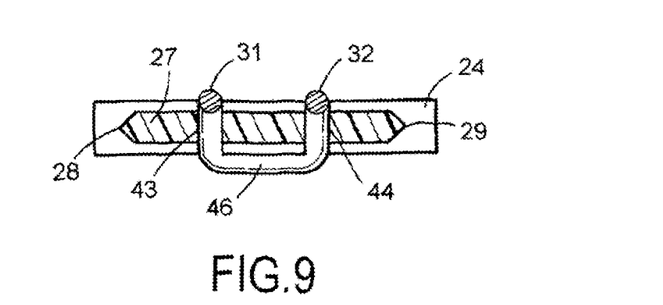
FIG. 9 is an enlarged sectional view taken along line 9-9 of FIG. 4.
Figure 10:
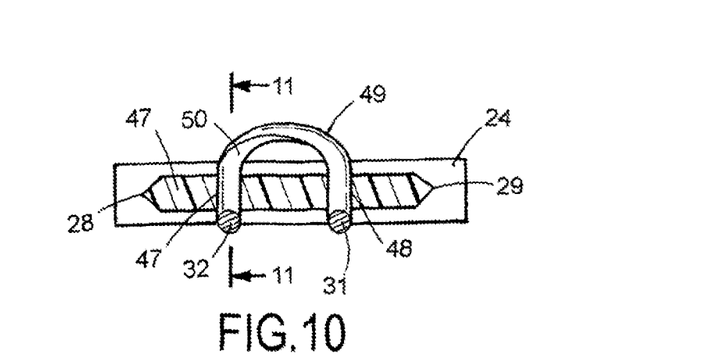
FIG. 10 is an enlarged sectional view taken along line 10-10 of FIG. 4.
Figure 11:
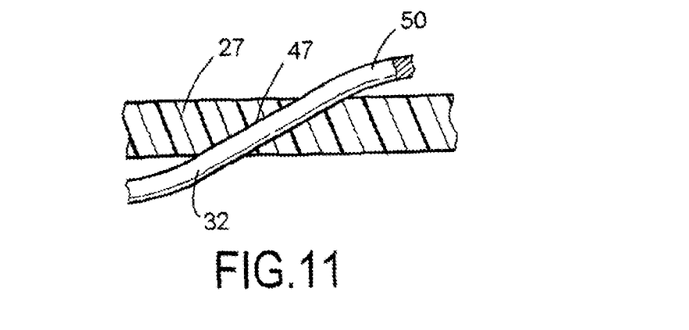
FIG. 11 is an enlarged sectional view taken along line 11-11 of FIG. 10.
Figure 12:
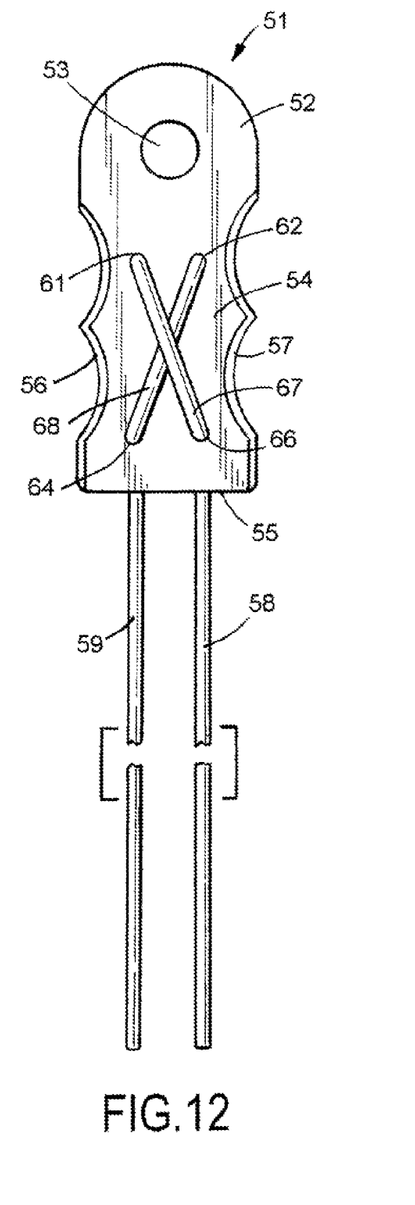
FIG. 12 is a top plan view of a modification of the combined cutting blade and foreshortened flexible filaments useable with the vegetation trimmer of FIG. 1.

A first embodiment of cutting tool 7, shown in FIGS. 2 to 11, has a flat cylindrical head 24 with a center hole 26 accommodating pin 21. Head 24 is joined to a flat blade or knife 27 having linear opposite side knife edges 28 and 29. Knife edges 28 and 29 can have a plurality of teeth or non-linear shapes. As shown in FIGS. 16 to 19, knife edges 28 and 29 are continuous straight edges that taper inwardly toward each other. Head 24 and blade 27 are a one-piece plastic member. The plastic is a fiber reinforced plastic. Head 24 and blade 27 can be a metal member, such as stainless steel. A pair of flexible filaments 31 and 32 attached to blade 27 extend radially from the outer end 30 of blade 27. Filaments 31 and 32 are elongated flexible plastic cords or strings. Filaments 31 and 32 can be made of other materials, such as composite strings. Blade 27 shown in FIGS. 16 to 23 has a first pair of holes 43 and 44 located adjacent head 24 and a second pair of holes 47 and 48 located adjacent the outer end of blade 27. As shown in FIG. 11, hole 47 extends at a downwardly and outwardly angle through blade 27. Hole 48 also extends downwardly and outwardly through blade 27. As shown in FIG. 9, filaments 31 and 32 extend through holes 43 and 44 with a loop 46 located below blade 27. Loop 46 joined to filaments 31 and 32 makes filaments 31 and 32 a single string filament. Filament segments 49 and 50 on top of blade 27 are crossed and extended through holes 47 and 48 as shown in FIG. 10. The crossed filament segments 49 and 50 anchor the filaments 31 and 32 to blade 27 and prevent the filaments from separating from blade 27. Filament 32 extended through hole 47, shown in FIG. 11, is not subjected to sharp right angle edges as the top and bottom edges of hole 47 are at obtuse angles which do not cut into filament 32.

Returning to FIGS. 2 and 3, cutting tool 8 has a radial blade 34 with a head 33 mounted on pin 22. Flexible filaments 36 and 37 connected to blade 34 extend radially outwardly from the outer end of blade 34. Cutting tool 9 has a radial blade 39 with a head 38 mounted on pin 23. Flexible filaments 41 and 42 connected to blade 34 extend radially outwardly from the outer end of blade 39. Cutting tools 8 and 9 have the same structure and size as cutting tool 7. Filaments 36 and 37 and 41 and 42 are crossed on blades 34 and 39 to maintain the filaments on the blades. Replacement filaments can be attached to the blades by threading the filaments through holes 43 and 44, crossing the filaments segments, and then threading the filaments through holes 47 and 48.

An example of cutting tool 7, has a flat plastic blade having length of 5 cm. and width of 2.5 cm. with knife edges 28 and 29 that converge outwardly to an outer end 30 having a width of 1.5 cm. The blade has a thickness of 4 mm. The filaments 31 and 32 are a one-piece flexible plastic cord with each filament 13 and 32 hanger length of 12 cm. from the outer end of the blade 27. The plastic cord has a circular cross section with a diameter of 2 mm.

Figure 13:
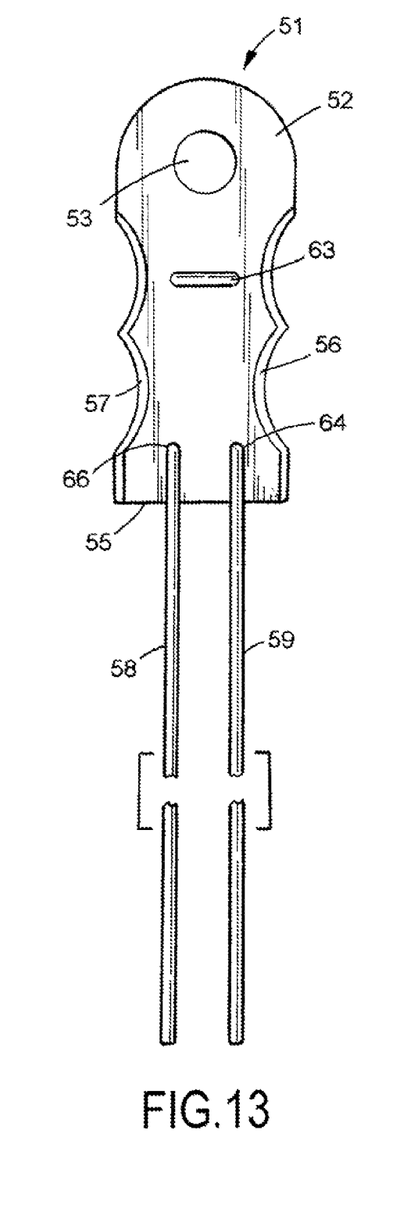
FIG. 13 is a bottom plan view of the combined cutting blade and foreshortened flexible filaments of FIG. 12.
Figure 14:
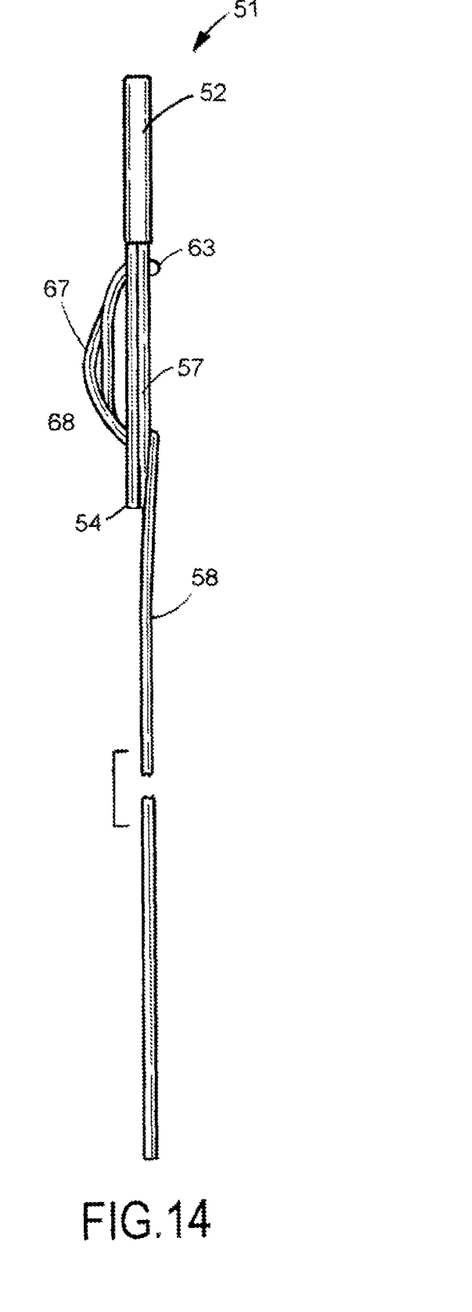
FIG. 14 is a side elevational view of the right side of FIG. 12.
Figure 15:
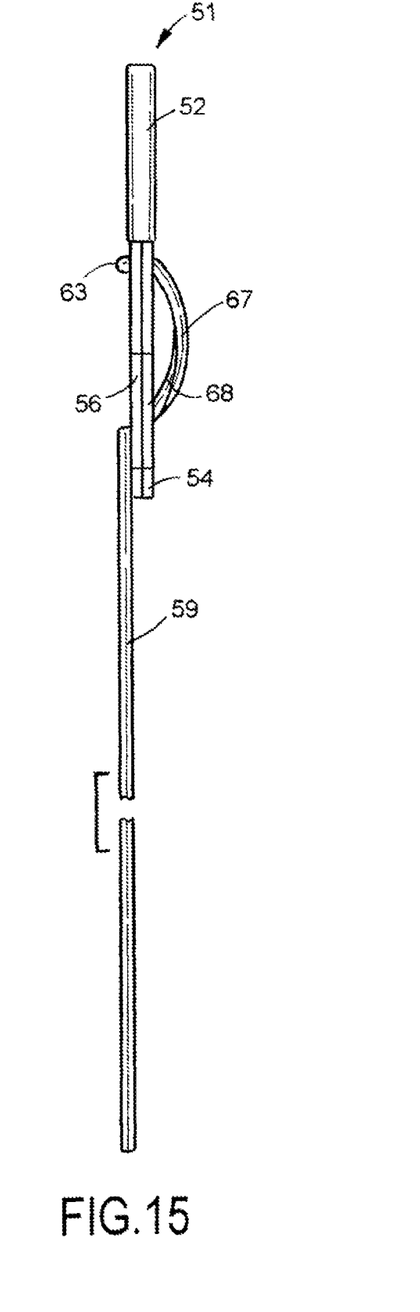
FIG. 15 is a side elevational view of the left side of FIG. 12.
Figure 16:
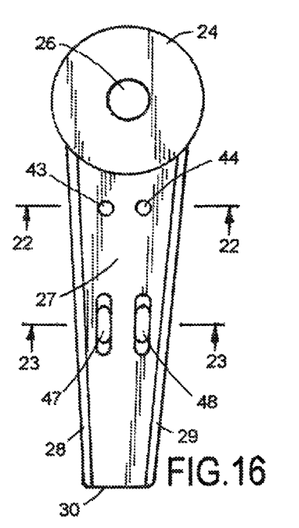
FIG. 16 is a front elevational view of the cutting blade of the cutting tool shown in FIGS. 2 to 5.
Figure 17:
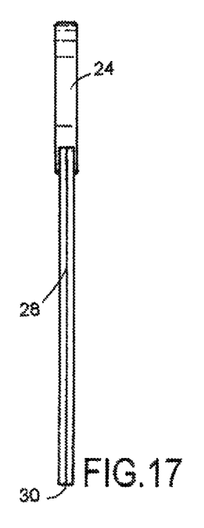
FIG. 17 is a side elevational view of the left side of FIG. 16.
Figure 18:
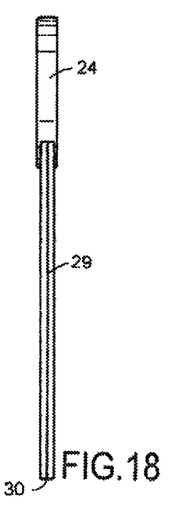
FIG. 18 is a side elevational view of the right side of FIG. 16.
Figure 19:
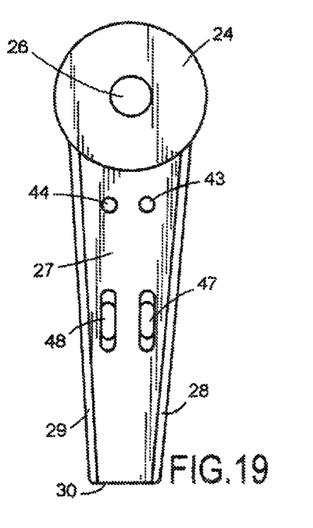
FIG. 19 is a back elevational view of FIG. 16.
Figure 20:
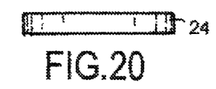
FIG. 20 is a top plan view of FIG. 16.
Figure 21:
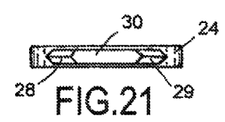
FIG. 21 is a bottom plan view of FIG. 16.
Figure 22:
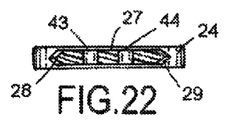
FIG. 22 is a sectional view taken along line 22-22 of FIG. 16.
Figure 23:
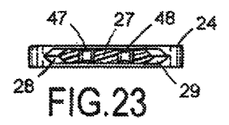
FIG. 23 is a sectional view taken along line 23-23 of FIG. 16.
Figure 24:
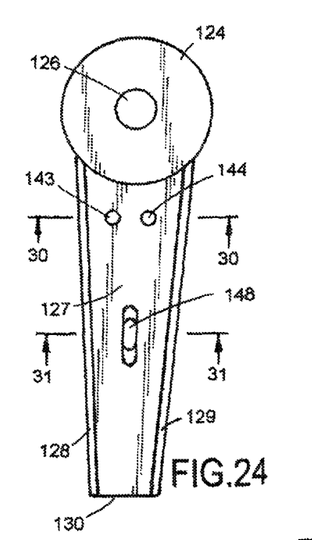
FIG. 24 is a front elevational view of a modification of the cutting blade of FIG. 16.
Figure 25:
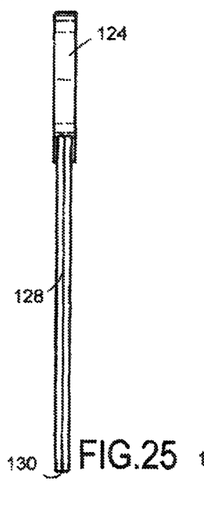
FIG. 25 is a side elevational view of the left side of FIG. 24.
Figure 26:
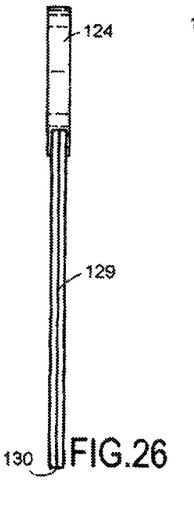
FIG. 26 is a side elevational view of the right side of FIG. 24.
Figure 27:
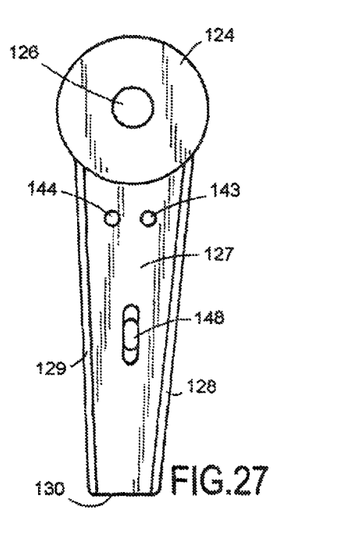
FIG. 27 is a back elevational view of FIG. 24.
Figure 28:
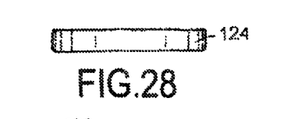
FIG. 28 is a top plan view of FIG. 24.
Figure 29:
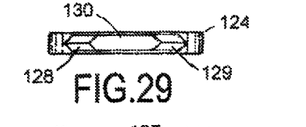
FIG. 29 is a bottom plan view of FIG. 24.
Figure 30:
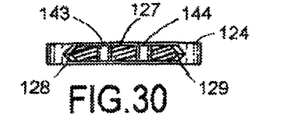
FIG. 30 is a sectional view taken along line 30-30 of FIG. 24.
Figure 31:
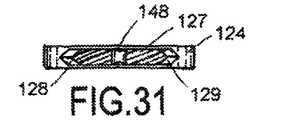
FIG. 31 is a sectional view taken along line 31-31 of FIG. 24.

A second embodiment of the cutting tool 51, shown in FIGS. 12 to 15, has a head 52 with a center hole 53. A blade 54 joined to head 52 has scalloped cutting side edges 56 and 57 and an outer end 55. Head 52 and blade 54 is a one-piece plastic member adapted to be mounted on a pin attached to head 6. Head 52 and blade 54 can be a one-piece metal member. Flexible filaments 58 and 59 attached to blade 54 extend radially away from end 55 of blade 54. A first pair of holes 61 and 62 in blade 43 adjacent head 52 accommodate filaments 58 and 59 with a filament loop 63 extended between holes 61 and 62 as shown in FIG. 13. Filaments 58 and 59 have crossed sections 67 and 68, shown in FIG. 12, and portions that extend through a second pair of holes 64 and 66 located adjacent the outer end 55 of blade 54. Holes 64 and 66 extend at downwardly and outwardly directed angles through blade 54 as shown by hole 47 in FIG. 11. The crossed sections 67 and 68 and loop 63 retain filaments on blade 54. The filaments 58 and 59 are a one-piece flexible plastic cord.

A modification of the blade for accommodating the filaments 31 and 32, shown in FIGS. 24 to 31, has the same parts as the cutting tool shown in FIGS. 16 to 23 with reference numbers having the prefix 1. The cutting tool has a flat cylindrical head 124 with a center hole 126 adapted to accommodate pin 21. A flat blade or knife 127 is joined to and extends laterally from head 124. Blade 127 has opposite continuous side edges 128 and 129 that taper inwardly toward each other. Side edges 128 and 129 can have a plurality of teeth or non-linear shapes. The out end 30 of blade 127 is flat and transverse to the longitudinal length of blade 127. A pair of holes 143 and 144 extend through blade 127 adjacent head 124. A single second hole 148 extends through the middle section of blade 127. Hole 148 extends at a downwardly and outwardly angle through blade 127. A filament extends through holes 143 and 144 and both sections of the filaments from holes 143 and 144 extends through the single second hole 148. The filament extends outwardly from the end 130 of blade 127, as illustrated in FIGS. 2 and 3.

The foregoing description is that of the preferred embodiments of the combined blades and flexible filaments of the invention and that various changes in the blades and flexible filaments may be made by persons skilled in the art without departing from the invention.

The invention claimed is:

1. A vegetation trimmer for cutting vegetation comprising:
   a wand,
   a motor mounted on the wand,
   a cutting head mounted on the wand operatively connected to the motor for rotation relative to the wand, and
   a plurality of cutting tools connected to the cutting head for rotation with the cutting head, each cutting tool having a blade having a body, said body having first and second ends, a head joined to the first end of the body, said second end of the body being spaced from the head and at least one side cutting edge on the body extending between the head and the second end of the body of the blade, a flexible filament connected to the body whereby on rotation of the cutting head and the cutting tools cut vegetation in the path of rotation of the cutting tools, the body including a first hole and a second hole laterally spaced from the first hole, said first and second holes extending through the body adjacent the head and a third hole and a fourth hole laterally spaced from the third hole, said third and fourth holes extending through the body adjacent the second end of the body, the first and second holes being spaced from the third and fourth holes and the flexible filament having first portions extending through the first and second holes, a loop portion joining the first portions, a second portion joined to one of the first portions and extending from the first hole to and through the fourth hole, a third portion joined to the other of the first portions and extending from the second hole to and through the third hole, said second and third portions being crossed between the first and second holes and the third and fourth holes, a fourth portion joined to the second portion and extending from the fourth hole away from the second end of the body and a fifth portion joined to the third portion and extending away from the second end of the body.

2. The vegetation trimmer of claim 1 wherein:
the flexible filament is a one-piece elongated plastic cord.
3. The vegetation trimmer of claim 1 wherein:
the body has a top surface and a bottom surface,
said third hole extending at an obtuse angle from the top surface to the bottom surface of the body and toward the second end of the body, and
said fourth hole extending at an obtuse angle from the top surface to the bottom surface toward the second end of the body.
4. The vegetation trimmer of claim 1 wherein:
the blade is a flat plastic member.
5. The vegetation trimmer of claim 1 wherein:
the blade is a one-piece plastic member.
6. The vegetation trimmer of claim 1 wherein:
said blade is a one-piece flat plastic member, and
the flexible filament is a one-piece elongated plastic cord.
7. A cutting tool on a cutting member of a vegetation trimmer comprising:
a blade having a body, said body having first and second ends, a head joined to the first end of the body, said second end being spaced from the head, and a side cutting edge extending between the head and the second end of the body, and
a flexible filament connected to the body,
the body including a first hole, a second hole laterally spaced from the first hole, said first and second holes extending through the body adjacent to the head, a third hole and a fourth hole laterally spaced from the third hole, said third and fourth holes extending through the body adjacent to the second end of the body, the first and second holes being spaced from the third and fourth holes,
the flexible filament having first portions extending through the first and second holes, a loop portion joined to the first portions located between the first and second holes, a second portion joined to one of the first portions and extending from the first hole to and through the fourth hole, a third portion joined to the other of the first portions and extending from the second hole to and through the third hole, said second and third portions being crossed between the first and second holes and the third and fourth holes, a fourth portion joined to the second portion and extending from the fourth hole away from the second end of the body, and a fifth portion joined to the third portion and extending away from the second end of the body.

8. The cutting tool of claim 7 wherein:
the head has a hole.
9. The cutting tool of claim 7 wherein:
the body of the blade includes two side cutting edges extending between the head and the second end of the body.
10. The cutting tool of claim 7 wherein:
the side cutting edge of the blade is a linear knife edge.
11. The cutting tool of claim 7 wherein:
the body has a top surface and a bottom surface,
said third hole extending at an obtuse angle from the top surface to the bottom surface toward the second end of the body, and
said fourth hole extending at an obtuse angle from the top surface to the bottom surface toward the second end of the body.
12. The cutting tool of claim 7 wherein:
the blade is a one-piece plastic member.
13. The cutting tool of claim 7 wherein:
the blade is a one-piece flat plastic member, and
said flexible filament is a one-piece elongated plastic line.
14. A cutting tool on a cutting member of a vegetation trimmer comprising:
a blade having a body, said body having a top surface, a bottom surface, a first end and a second end spaced from the first end, a head connected to the first end of the body, and a side cutting edge extending between said head and the second end of the body,
a flexible filament connected to the body of the blade,
said body of the blade including a first hole, a second hole laterally spaced from the first hole, said first and second holes extending through the body adjacent to the head, and a third hole extending through the body adjacent to the second end of the body, the first and second holes being spaced from the third hole, said third hole extending an obtuse angle from the top surface to the bottom surface toward the second end of the body,
the flexible filament having first portions extending through the first and second holes, a loop portion joining the first portions located between the first and second holes, a second portion joined to one of the first portions and extending from the first hole to and through the third hole, a third portion joined to the other of the first portions and extending from the second hole to and through the third hole, a fourth portion joined to the second portion extending from the third hole away from the second end of the body, and a fifth portion joined to the third portion extending from the third hole away from the second end of the body.
15. The cutting tool of claim 14 wherein:
the flexible filament is a one-piece elongated plastic cord.
16. The cutting tool of claim 14 wherein:
the head and body of the blade is a one-piece plastic member, and
the flexible filament is a one-piece elongated plastic cord.

* * * * *